United States Patent [19]

Hunt

[11] Patent Number: 4,878,787
[45] Date of Patent: Nov. 7, 1989

[54] COARSE/FINE ADJUSTMENT BORING HEAD

[75] Inventor: Carl E. Hunt, Davisburg, Mich.
[73] Assignee: GTE Valenite Corporation, Troy, Mich.
[21] Appl. No.: 258,345
[22] Filed: Oct. 17, 1988
[51] Int. Cl.⁴ .......................................... B23B 29/034
[52] U.S. Cl. .................................. 408/181; 408/153
[58] Field of Search .............. 408/181, 154, 153, 151, 408/150, 185, 147, 182, 183; 279/6

[56] References Cited

U.S. PATENT DOCUMENTS

| | | | |
|---|---|---|---|
| 2,553,761 | 5/1951 | Gooding | 408/185 X |
| 2,629,270 | 2/1953 | Kaehlert | 408/181 |
| 3,518,738 | 7/1970 | Porter | 408/153 X |
| 3,709,625 | 1/1973 | Erkfritz | 408/181 |
| 4,708,543 | 11/1987 | Plutschuck et al. | 408/151 |

FOREIGN PATENT DOCUMENTS

| | | | |
|---|---|---|---|
| 835378 | 12/1938 | France | 408/153 |
| 559442 | 2/1944 | United Kingdom | 408/153 |

*Primary Examiner*—William Briggs
*Attorney, Agent, or Firm*—David J. Koris

[57] ABSTRACT

Coarse/fine adjustment boring head employing a transverse sleeve threaded into and extending through a boring head body providing coarse incremental radial adjustment of an insert cartridge, axially oriented within a sleeve, together with a fine radial adjustment of the cartridge relative to the sleeve effected through a differential screw having differential pitch threads with lead in the same direction.

15 Claims, 2 Drawing Sheets

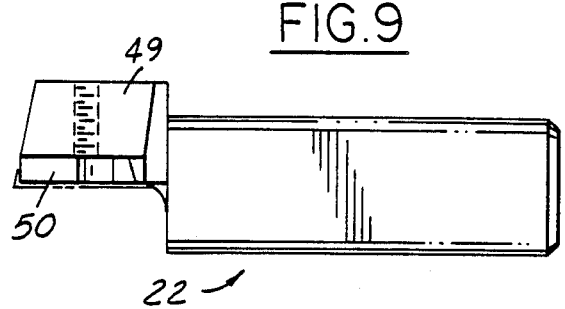
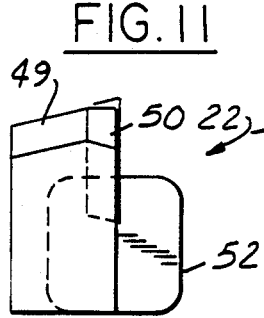
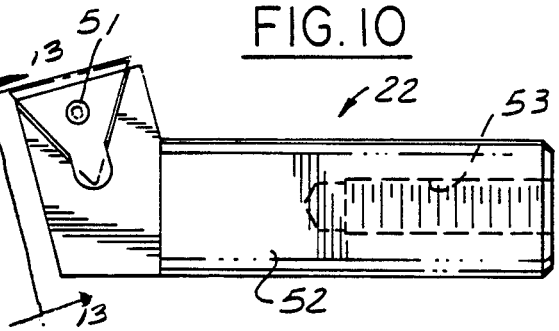
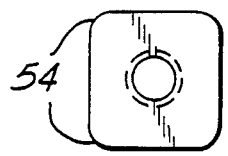
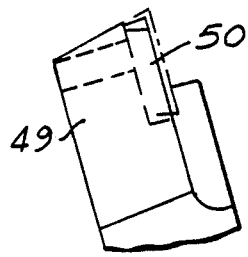
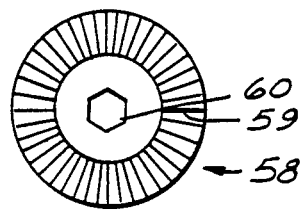
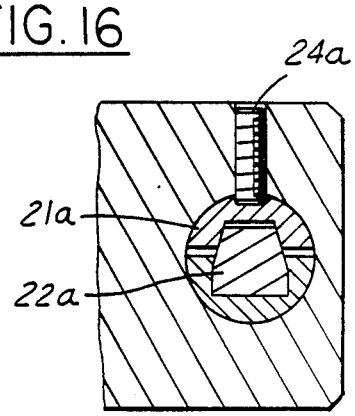
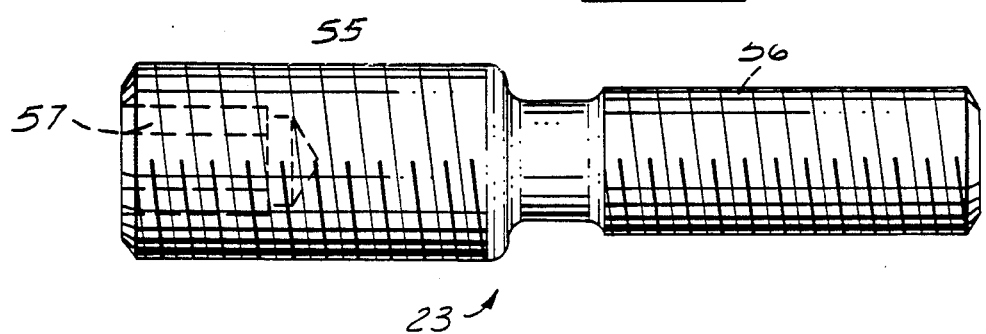

COARSE/FINE ADJUSTMENT BORING HEAD

BACKGROUND OF THE INVENTION

U. S. Pat. No. 4,708,543 discloses a coarse radially adjustable tool holder employing an eccentric adjustment ring combined with linear guide means confining the tool point to a linear adjustment path within a fine adjustment eccentric bushing such as provided by "Briney Precision Adjustment Tool". Such tool holder accommodates a boring bar capable of operating within relatively small diameters. The tool holder provides a relatively coarse adjustment, e.g., in the order of 0.100" to 0.125" with graduations in a rotating gauge ring equal to 0.005" in diameter with a secondary fine adjustment of 0.010" with a precision of 0.0005" diametrical adjustment for each graduation of adjustment gauge ring.

For each of the coarse and fine adjustments, an eccentric bushing is employed to effect a total range of adjustment based on radial eccentricity.

BRIEF DESCRIPTION OF THE PRESENT INVENTION

With a boring head of adequate size to accommodate a transverse cartridge/sleeve within a threaded bore extending through the body, a coarse adjustment is effected by an externally threaded sleeve advancing in the order of 0.025" per revolution to a predetermined fixed circumferential position. Fine longitudinal adjustment of a cartridge without rotational displacement within the sleeve is effected by a differential pitch screw engaging respectively a threaded hole in a head of the sleeve and a threaded hole in the cartridge employing an appropriate differential pitch together with a calibrated dial for the differential screw. A retention screw in the body engages a longitudinal groove on the sleeve after a desired coarse degree of adjustment has been made. When a final fine degree of adjustment of the cartridge has been made with the differential screw, the retention screw is tightened to clamp the sleeve which is split for deflection to rigidly secure the cartridge.

BRIEF DESCRIPTION OF THE DRAWINGS

FIG. 9 is a side elevation of the boring head cartridge;

FIG. 10 is a plan view of the cartridge;

FIG. 11 is a head end view of the cartridge;

FIG. 12 is a sleeve end view of the cartridge;

FIG. 13 is a fragmentary projection view taken along the line 13—13 of FIG. 10;

FIG. 14 is an enlarged side elevation of the differential screw employed in adjusting the cartridge relative to the sleeve;

FIG. 15 is an end view of the dial employed in adjusting the differential screw;

FIG. 16 is a sectional view of a modified form of cartridge and sleeve clamping configuration.

DETAILED DESCRIPTION OF A PREFERRED EMBODIMENT

Figure 1:
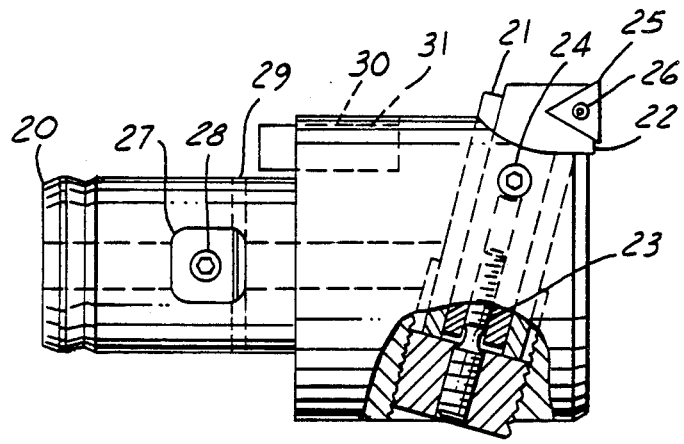
FIG. 1 is a plan view of the present coarse/fine adjustment boring head assembly.

With reference to FIG. 1, the boring head assembly comprises body 20, sleeve 21, cartridge 22, differential screw 23, cone point screw 24, insert 25, lock screw 26, wedge 27, differential screw 28, pin 29, drive key 30 and retention screw 31.

Figure 2:
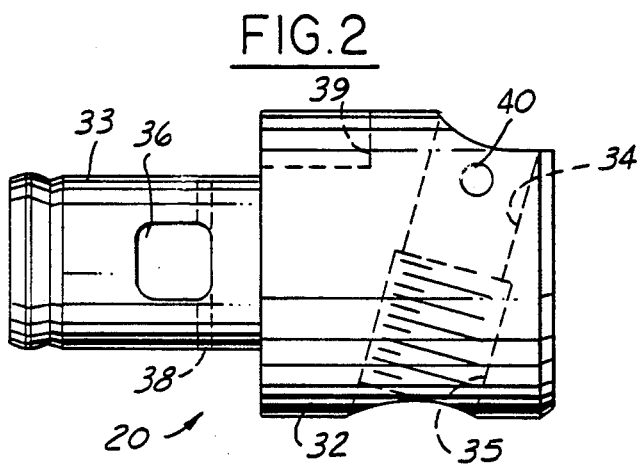
FIG. 2 is a plan view of the boring head body.
Figure 3:
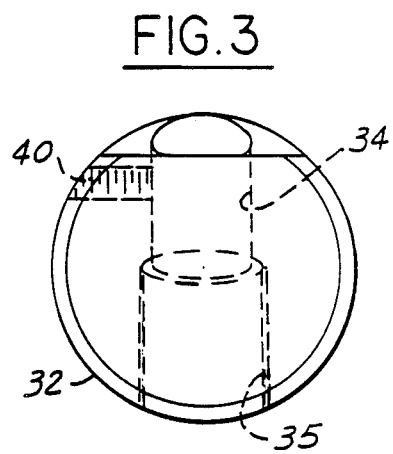
FIG. 3 is an end view of the body.
Figure 4:
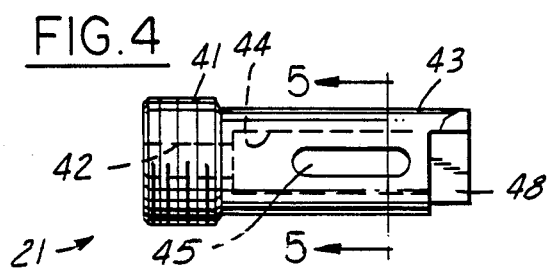
FIG. 4 is a plan view of the boring head sleeve.

With reference to FIG. 2, boring head 20 comprises cylindrical head 32, shank 33, sleeve bore 34 with threaded counterbore 35, wedge pocket 36 (not shown), cross pin hole 38, key pocket 39 and screw hole 40.

With reference to FIGS. 4-8, sleeve 21 comprises externally externally threaded head 41 with internal threaded hole 42, cylindrical outer sleeve surface 43, square internal cartridge chamber 44, central V-groove 45, through slot 46, spanner wrench holes 47, and cartridge cutter head clearance recess 48.

With reference to FIGS. 9-12, cartridge 22 includes head 49 with triangular insert pocket 50 and threaded lock screw hole 51, square cartridge shank 52 with threaded differential screw hole 53, and round corners 54.

With reference to FIG. 14, the enlarged view of differential screw 23 includes sleeve head engaging threaded end 55, cartridge engaging threaded end 56 and wrench socket recess 57.

With reference to FIG. 15, fine adjustment dial 58 is provided with 36 marked graduation lines 59, 10° apart as shown, and a through wrench passage 60.

Figure 5:
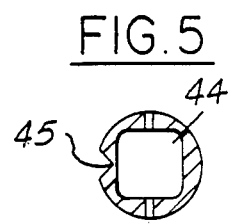
FIG. 5 is a sectional view taken along the line 5-5 of FIG. 4.
Figure 7:
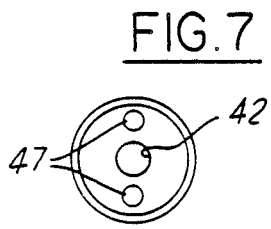
FIG. 7 is a head end view of the sleeve.
Figure 6:
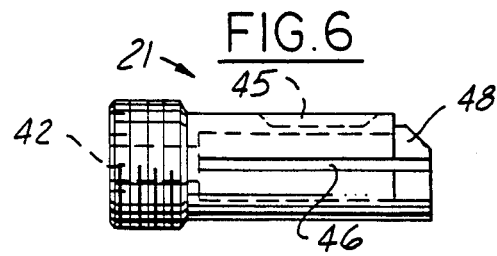
FIG. 6 is a side elevation of the boring head sleeve.
Figure 8:
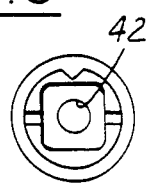
FIG. 8 is a cartridge retaining end view of the sleeve.

FIG. 16 discloses an optional clamping configuration for the cartridge in a sectional view similar to FIG. 5.

Referring again to FIG. 1, in operation, coarse adjustment is effected, e.g., in 0.025" increments, by loosening screw 24 and rotating sleeve 21 within a range from minimum radius shown, to any position within threaded bore 35. Upon reaching the desired coarse adjustment, a fine adjustment, e.g., within a range of 0.025" displacement of cartridge 22 within sleeve 21 is effected through wrench rotation of differential screw 23 from minimum radius position shown through approximately 0.38" travel within the respective threaded holes 42 in sleeve 21 and 53 in cartridge 22 thereby providing a reduction ratio between coarse and fine of approximately 15:1. Displacement of cartridge 22 within sleeve 21 for each revolution of differential screw 23 will be equal to the difference in the differential pitch of a single thread. For example, with reference to FIG. 14, if thread 55 is a ¼-28 thread and 56 a No. 10-32 thread, the single thread pitch difference will be 0.03571"−0.03125"=0.00446", and each 10° increment as indicated on the graduation lines of the FIG. 15 dial will be equal to 0.000124". A hexagonal head wrench projecting through hexagonal passage 60 and dial 58 into matching recess 57 in differential screw 23 will provide coordinated movement of screw and dial relative to any fixed mark on head 41 of sleeve 21 to provide coordinated accurate calibration of adjustment.

The foregoing dimensions are a typical example to provide an adjustable boring diameter, with cartridge 22 disposed at a 15" angle to the boring axis as shown, through a range in the order of 2.4" to 3.2", 32 and 40 pitch differential threads would provide a 0.00625" per revolution fine displacement adjustment while No. 10-32 and M6-0.75 millimeter differential threads would provide a 0.00173" per revolution fine adjustment.

It will be understood that the foregoing references to differential threads relate to the differential of thread pitch only, utilizing the same direction of thread. Conventional differential screws, in contrast, and threaded with opposite leads in order to amplify rather than reduce relative displacement between connected parts. It will also be understood that the numerical examples given relate to linear travel in the direction of sleeve axis which will equal radial travel of the cutting insert for determining boring diameter appropriate for an optional installation with sleeve axis normal to boring head axis. However, in the case of the 15° angularity as shown, the foregoing values will convert to radial dimensions by multiplying a factor of cos. of 15°.

When initial coarse adjustment of sleeve 21 has been completed, screw 24 passing through threaded hole 40 in body 20 is turned into engagement of its cone point with slot 45 in sleeve 21 sufficiently to orient the circumferential position of the sleeve. Upon final adjustment of differential screw 23, further tightening of the cone point serves to clamp sleeve and cartridge in rigid association through deflection of sleeve 21 as split by slot 46.

With reference to FIG. 16, an optional modification of cartridge 22a and sleeve 21a, through use of partially tapered walls, provides for rigid clamping in lateral as well as the axial direction of screw 24a.

Conventional standard wedge 27 and differential screw 28 provide for retaining the boring head against the shoulder of a standard machine tool spindle, with connection drive provided by key 30.

In practical application of the foregoing disclosed boring head, the cutting insert 25 may be coarse adjusted against a desired boring diameter gauge surface through rotation of sleeve 21 while screw 24 is loosened out of notch 45 and thereupon backed off until screw 24 aligns with groove 45 (less than a full revolution). Screw 24 is then partially tightened to engage the notch and circumferentially orient sleeve 21 within the range of fine adjustment achieved by advancing differential screw 23 to again register insert 25 with the gauge surface. To readjust the required boring diameter after a test boring, or after encountering wear in service detected by appropriate gauging of workpiece bore, adjustment of the tool point may be effected to any required accurate degree by simply loosening screw 24 and advancing differential screw 23 with reference to dial 58, and then retightening screw 24 for continued service.

It will be seen that this boring head provides the combination of coarse adjustment covering a wide range of diameters together with a fine calibrated adjustment to any required degree of precision. The construction is relatively simple and economical to manufacture as compared to the aforementioned prior art coarse and fine adjustment disclosed by U. S. Pat. 4,708,543.

With the configuration illustrated, ranges of diameter size adjustment for typical standard diameter boring heads can provide approximately one-third of the minimum boring diameter. For example, a 50-66 millimeter diameter boring range in a 40 millimeter head; a 63-84 millimeter boring diameter in a 50 millimeter boring head; and 80-106 millimeter boring diameter in a 63 millimeter boring head; and a 100-130 millimeter range of boring diameter in an 80 millimeter boring head.

I claim:

1. Coarse/fine adjustable boring head comprising a body having a transverse threaded bore, a through sleeve with externally threaded head adjustable within said bore to establish a coarse transverse adjustment for said sleeve, cutting tool cartridge means nonrotatably transversely adjustable within said sleeve to establish a fine transverse final boring diameter adjustment, unidirectional lead differential pitch threaded holes respectively in said head and an adjacent end of said cartridge means, and matching differential pitch screw means engaging respectively said threaded holes, whereby said sleeve may be coarse adjusted in single revolution external thread pitch increments, and said cartridge means may be fine adjusted relative to said sleeve through rotation of said differential screw in continuous whole or partial revolution increments.

2. Boring head of claim 1 including means to retain said sleeve in a predetermined constant circumferential position throughout its incremental range of transverse adjustment.

3. Boring head of claim 2 wherein said retention means comprises a longitudinal V-groove in the outer surface of said sleeve, and a threaded cone pointed screw in said body for engaging said V-groove in said predetermined position after any 360° incremental adjustment.

4. Boring head of claim 2 including means for clamping said cartridge relative to said sleeve in final adjusted position.

5. Boring head of claim 3 including means for clamping said cartridge comprising a transverse slit in said sleeve extending normal to the axis of said cone pointed screw rendering said sleeve deflectable to clamping engagement of said cartridge means.

6. Boring head of claim 5 wherein said cartridge means and sleeve are respectively provided with innerengaging generally square cross sectional configuration.

7. Boring head of claim 6 including cross sectional innerengaging tapered surface means for effecting bidirectional clamping of said cartridge means within said sleeve.

8. Boring head of claim 1 wherein said cartridge means includes an indexable cutting insert.

9. Boring head of claim 1 wherein said transverse threaded bore extends at an oblique angle relative to a boring axis, and said cartridge means includes a head for seating said insert at a position where its cutting point projects radially and axially to the extremities of said boring head.

10. Boring head of claim 1 wherein said threaded bore and externally threaded head provide a range of adjustment in the order of one third of the minimum boring diameter.

11. Boring head of claim 1 wherein said respectively threaded holes provide a range of differential screw travel in the order of 15 times the external thread pitch of said sleeve.

12. Boring head of claim 1 wherein said differential screw travel provides a range of relative sleeve and cartridge means displacement at least equal to a single thread pitch of said external sleeve thread.

13. Boring head of claim 1 including a hexagonal wrench recess in one end of said differential screw for adjusting its position.

14. Boring head of claim 1 including calibrated dial means provided for gauging the circumferential rotation of said differential screw.

15. Boring head of claim 14 wherein said dial means is provided with a hexagonal wrench through passage for simultaneous engagement by a hexagonal wrench employed in rotating said differential screw.

* * * * *